United States Patent
Luthra (10) Patent No.: US 7,333,787 B2
(45) Date of Patent: Feb. 19, 2008

(54) REDUCING INTERFERENCE IN HIGH SPEED HOME NETWORK USING SIGNAL PROCESSING

(76) Inventor: Tarang Luthra, 13695 Wisntanley Way, San Diego, CA (US) 92130

( * ) Notice: Subject to any disclaimer, the term of this patent is extended or adjusted under 35 U.S.C. 154(b) by 515 days.

(21) Appl. No.: 10/668,987

(22) Filed: Sep. 22, 2003

(65) Prior Publication Data
US 2005/0064920 A1    Mar. 24, 2005

(51) Int. Cl.
*H04L 1/02* (2006.01)
(52) U.S. Cl. ............... 455/134; 455/140; 455/343.2
(58) Field of Classification Search ............ 455/134, 455/133, 132, 140, 137, 343.1, 343.2
See application file for complete search history.

(56) References Cited

U.S. PATENT DOCUMENTS

| | | | |
|---|---|---|---|
| 6,347,234 B1 | 2/2002 | Scherzer | |
| 6,360,088 B1 | 3/2002 | Shi et al. | |
| 6,470,194 B1 | 10/2002 | Miya et al. | |
| 6,493,545 B1 | 12/2002 | Sugaya | |
| 6,560,299 B1 | 5/2003 | Strolle et al. | |
| 6,563,858 B1 | 5/2003 | Fakatselis et al. | |
| 6,564,036 B1 | 5/2003 | Kasapi | |
| 6,574,293 B1 | 6/2003 | Khayrallah et al. | |
| 6,853,694 B1* | 2/2005 | Beaudin et al. | 375/347 |
| 2002/0016156 A1* | 2/2002 | Ogino et al. | 455/134 |
| 2003/0031266 A1 | 2/2003 | Lo | |
| 2003/0092396 A1 | 5/2003 | Fifield | |
| 2003/0096617 A1 | 5/2003 | Miller, II et al. | |
| 2003/0100343 A1 | 5/2003 | Zourntos et al. | |
| 2004/0253955 A1* | 12/2004 | Love et al. | 455/442 |

* cited by examiner

*Primary Examiner*—Edward F. Urban
*Assistant Examiner*—Adeel Haroon
(74) *Attorney, Agent, or Firm*—Fish & Richardson P.C.

(57) ABSTRACT

A method includes receiving a plurality of signal inputs from a plurality of antenna elements, determining a signal strength of the plurality of signal inputs, receiving a selection of a reduced power consumption and determining a combination of the plurality of signal inputs to combine in a combined signal, the combination having a number of signal inputs that is less than all of the plurality of signal inputs.

22 Claims, 12 Drawing Sheets

Fig 1 Effect of noise on a received waveform

Fig 2 Effect of interference on a received waveform

Fig 3 Antennae Array Geometry

Fig 4 Beam Scanning

Fig 5 Reduction in Noise Power as a function of number of antennae elements

Fig 6a Signal to Noise Ratio for 1 Element Array

Fig 6b Signal to Noise Ratio for 2 Element Array

Fig 6c Signal to Noise Ratio for 5 Element Array

Fig 7a Beam Pattern for Two Elements

Fig 7b Beam Pattern for Five Elements

Fig 7c Beam Pattern for Five Elements

Fig 8a Radial Plot of beam pattern of antennae array with two elements

Fig 8b Radial Plot of beam pattern of antennae array with five elements

Fig 8c Radial Plot of beam pattern of antennae array with ten elements

Fig 9a Effect of interference on signal for one antennae element array

Fig 9b Effect of interference on signal for five antennae element array

Fig 9c Effect of interference on signal for ten antennae element array

Fig 10 Reduction in Interference as a function of number of antennae elements

Fig 11a Scanned Beam Pattern for ten antennae elements

Fig 11b Scanned Radial Beam Pattern for ten antennae elements

REDUCING INTERFERENCE IN HIGH SPEED HOME NETWORK USING SIGNAL PROCESSING

BACKGROUND

This application relates to wireless systems.

A wireless system refers to two or more user devices that communicate with each other without wires; instead the devices communicate using radio waves. The user devices may be personal computers, laptop computers, personal digital assistant (PDA), or the like. One example of a wireless system is a Local Area Network (LAN) that operates in a limited area, such as a home or business. A wireless LAN may also include a router or gateway device. The router or gateway device forwards data packets from a source to a destination. The router or gateway device may also be connected to a Wide Area Network (WAN), such as the Internet. For example, the router or gateway device may forward data received from the Internet to a particular user device on the LAN.

Transmissions between wireless devices generally use RF (Radio Frequency) signals. Each user device on the wireless LAN will typically include a transmitter and a receiver circuit, and one or more antenna elements for sending and receiving wireless signals. In some cases the transmitter and receiver circuit may be implemented in the same device, and referred to as a transceiver.

Wireless signals may become attenuated (e.g., lose signal strength) during transmission as the signal travels through walls or over long distances. Received RF signals may also include some amount of noise. The noise may reduce the accuracy of the system by causing errors in the received signal. The accuracy of a wireless system is generally evaluated by a Signal-to-Noise power Ratio (SNR) associated with a signal. The higher the SNR, the greater the accuracy. There are several different factors which may affect the SNR of a signal. For example, as a transmitter is moved farther away from a receiver, the received signal strength may be reduced and the SNR may be reduced. Therefore the noise in a received signal becomes more significant as the receiver is moved farther away from the transmitter. As another example, obstructions in the path between the transmitter and receiver may also lower the SNR. Along with this lessening of signal strength, other devices such as a Microwave oven or a cordless phone that radiate in the same spectrum cause interference with the signal.

Current products in the market typically use one antenna or sometime two antennae in the receiving circuit of a user device. If multiple antennae are used, only one antenna with the best signal to noise ratio is picked. They do not combine the antennae signals to increase the signal to noise ratio thus, not using the other antennae in the device efficiently.

SUMMARY

This application describes various implementations of a system and/or a method for increasing the signal strength of a signal received by a wireless user device. The system includes a user device coupled to a transceiver, the transceiver having multiple antenna elements to receive a wireless signal. The received signals from each antenna element are selectively combined to form a combined signal having an increased signal strength that is input to the user device. The ability to provide a combined signal having increased signal strength may increase the accuracy and overall transmission speed of the wireless system.

In one aspect a method includes receiving a plurality of signal inputs from a plurality of antenna elements, determining a signal strength of the plurality of signal inputs, receiving a selection of a reduced power consumption and determining a combination of the plurality of signal inputs to combine in a combined signal, the combination having a number of signal inputs that is less than all of the plurality of signal inputs.

Details of one or more implementations are set forth in the accompanying drawings and the description below. Other features and advantages may be apparent from the description and drawings, and from the claims.

DETAILED DESCRIPTION

There are two common problems faced in a wireless communication system like Wireless Home Networking. One problem is that signal strength gets attenuated as it travels through walls. Therefore the noise in the receiver circuits becomes more significant as we move farther away from the transmitter. Along with this lessening of signal strength, other devices such as a Microwave oven or a cordless phone that radiate in the same spectrum cause interference with the signal.

Figure 1:
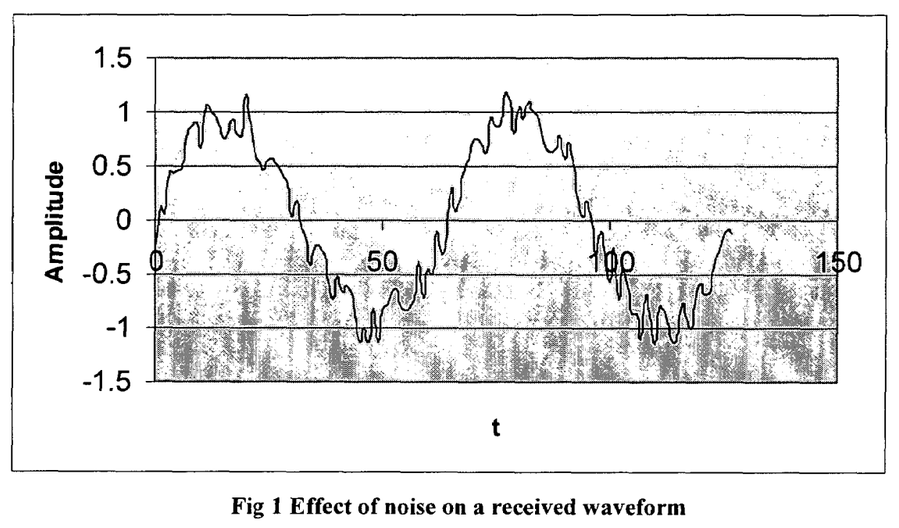
FIG. 1 is a plot illustrating a sinusoidal signal with noise.
Figure 2:
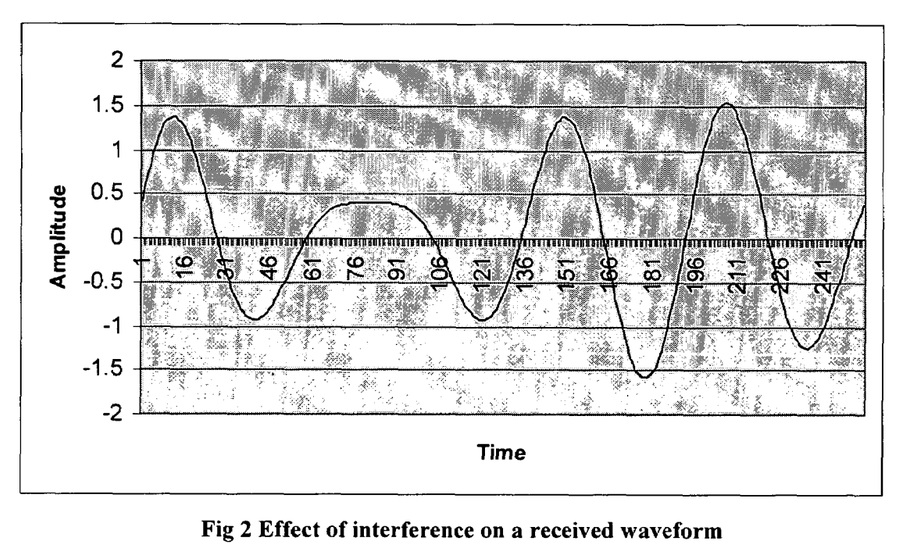
FIG. 2 is a plot illustrating a sinusoidal signal with interference.

FIG. 1 shows what a sinusoidal signal with noise look like, and FIG. 2 shows what a sinusoidal signal with interference looks like. As can be seen from the figures, both the noise and the interference distort the received waveform and can introduce errors in the received information. Hence, the accuracy of a wireless system depends on the signal to noise power and signal to interference power ratios. The presence of noise and interference limits the distance over which one can communicate or cause the speed of communication to drop down to 5.5 Mbps, then 2 Mbps and down to 1 Mbps or lower. The smaller the noise and interference is, a higher performance of the system is achieved.

Figure 3:
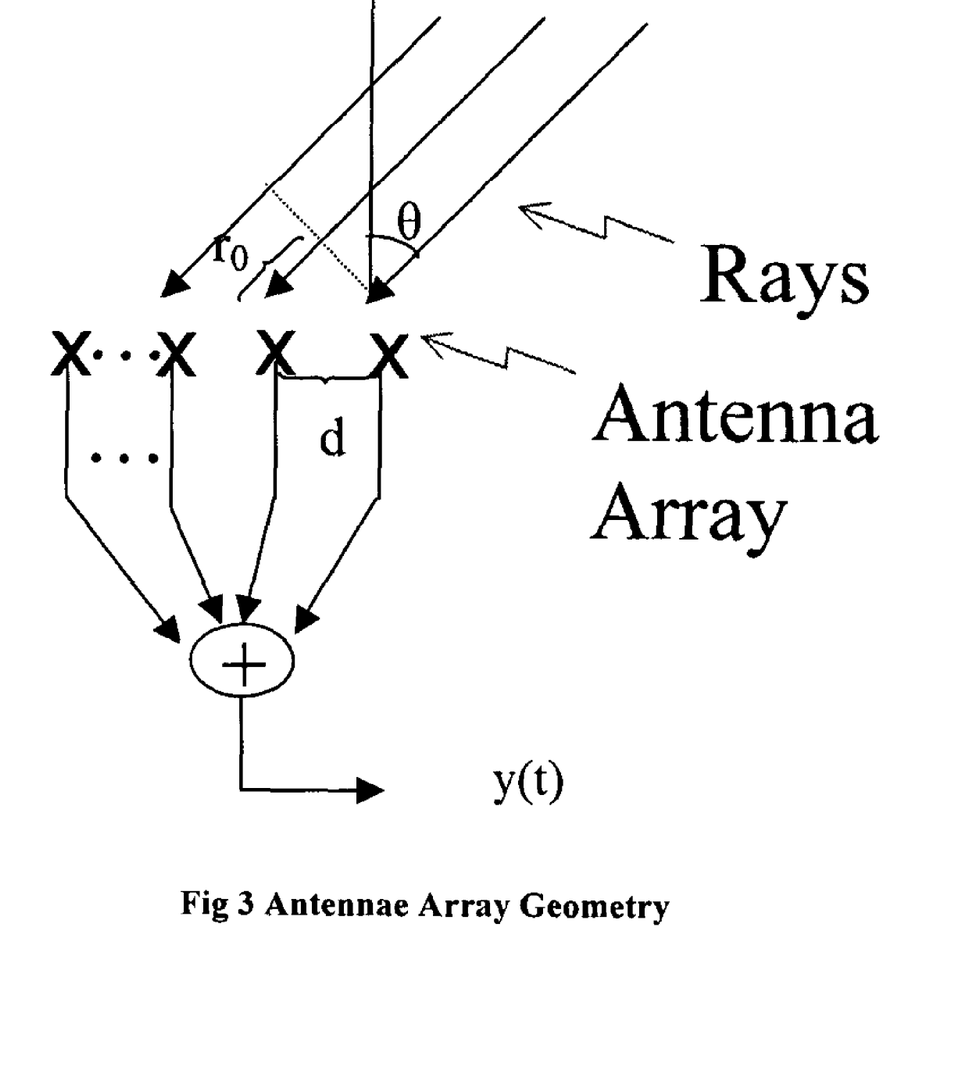
FIG. 3 is a block diagram of an antennae array.

FIG. 3 shows the basic geometry of an Antennae array. The antennae elements in this figure are denoted by "X" marks. Rays are coming from a source in the direction at $\theta_o$ from the axis normal to the axis of the array. The output of the each element is added together to produce the output y(t) of the array.

Equation of an electromagnetic wave w(t,r) received at the antennae elements is given by:

$$w(t,r)=A(t)\sin(2\pi\Phi t-2\pi r/\lambda) \quad (1)$$

where $\Phi$ is the frequency of the wave, $\lambda$ is the wavelength, t is time variable, r is distance traveled by the wave, A(t) is the amplitude corresponding to the information carried by the sine wave. For simplicity and without loss of generality, A(t) is assumed to be 1. Frequency $\Phi$ and the wavelength $\lambda$ are related by $$\Phi\lambda=c \quad (2)$$

where c is speed of the wave given by $2.998\times10^{10}$ cms/sec sec.

Let the first antenna element be at coordinate (0,0). The wave received at the first element is given by substituting r=0 in equation (1).

$$w(t,0)=\sin(2\pi\Phi t) \quad (3)$$

Let us now consider the case where one more antenna added to our receiver. The electromagnetic wave arriving at second element travels $r_0$ cm more (see FIG. 1) Therefore, the wave received at the second element is given by:

$$w(t, r_0)=\sin(2\pi\Phi t-2\pi r_0/\lambda) \quad (4)$$

Let d be the distance between two antennae elements. From geometry, as shown in FIG. 1, $r_0$ is given by:

$$r_{0=d} \sin \theta \quad (5)$$

where d is the spacing between the elements and $\theta$ is the angle of arrival (which is same as the direction angle of the source) relative to the normal to the line containing the antennae array. From equations (4) and (5), we get the equation of the wave received at the second element as:

$$w(t, d)=\sin(2\pi\Phi t-2\pi d \sin \theta/\lambda) \quad (6)$$

Now if we combine the output of these two elements, we get:

$$w(t,0)+w(t,d)=\sin(2\pi\Phi t)+\sin(2\pi\Phi t-2\pi d \sin \theta/\lambda)$$

In general, the output y(t) of N antennae element array will be $$y(t)=\Sigma_{i=0, N-1}w(t, id)=\Sigma_{i=0, N-1}\sin(2\pi\Phi t-2\pi id \sin \theta/\lambda) \quad (7)$$

If the array is looking in the direction of the source, i.e. $\theta=0°$, then all the waves coming from this source at each element have the same phase and therefore add up together to produce:

$$y(t)=N*\sin(2\pi\Phi t) \quad (8)$$

Signal amplitude will now increase N times. Thus, as we add more elements the signal amplitude increases linearly.

The antennae elements also add noise to the received RF (Radio Frequency) signal. As we add more antennae elements, the noise in each element also adds up. However, it does not add up by the same factor, as does the signal strength. Let $n_i(t)$ be the noise in the $i^{th}$ element. The output of the array is now given by:

$$y(t)=\Sigma_{i=0, N=1}\{\sin(2\pi\Phi t-2\pi id \sin \theta/\lambda)+n_i(t)\} \quad (9)$$

$$=\Sigma_{i=0, N-1} \sin(2\pi\Phi t-2\pi id \sin \theta/\lambda)+\Sigma_{i=0, N-1}n_i(t) \quad (10)$$

Again, if the source at $\theta=0°$, the output of array is given by:

$$y(t)=N*\sin(2\pi\Phi t)+\Sigma_{i=0, N-1}n_i(t) \quad (11)$$

Unlike the signal, the noise in an element is random and has a value is independent of the noise values in other elements. Therefore, the noise in different elements does not have the same phase and it does not add up linearly. Hence, the signal to noise ratio will improve in the output of the array as the signal amplitude increases linearly but noise does not. To prove that the signal to ratio increases with number of antennae element, I simulated the antennae array experiment in computer and measured the noise power at the output of the array and, as shown in the next section, plotted the noise to signal power as function of number of elements. This software also produced the result showing how the noise-to-signal ratio reduces as a function of number of elements.

If a source is in direction other than $\theta=\theta_0$ then the signal coming from that source will not add in phase and the signal at the output of the array will be smaller in comparison to our source signal given by equation (8). If we have the desired source in the direction of and an undesired source (referred as interferer) in $\theta=\theta_0$ direction then at the output of the array the signal corresponding to the desired source will increase linearly with the number of elements but the signal corresponding to the interferer will not increase in the same way). This process is also called "beam forming" where we are able to look in one given direction while reducing the signal coming from other direction.

Therefore, having an antennae array will help in not only reducing the noise but also in reducing the signals coming from various interferers (like, microwave oven, cordless phone etc.). This will also improve the signal to interference ratio.

Figure 4:
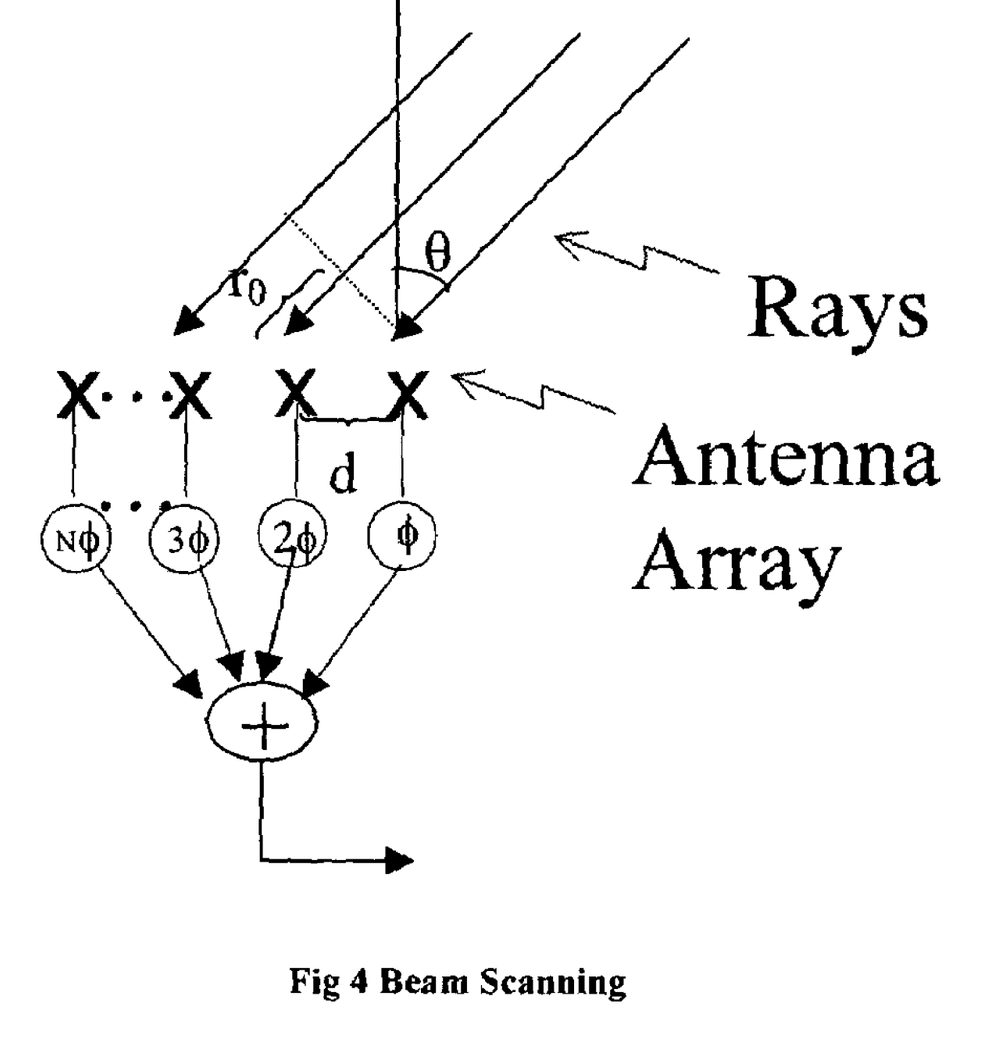
FIG. 4 illustrates beam scanning with an antenna array.

In practice the sources of interest are not always in broadside ($\theta=0°$). Therefore, it becomes necessary to steer the beam in some arbitrary direction $\theta_0$. To do so the sine waves coming out of element number i are added after phase shifting by $i*\pi*\sin(\theta 0)$, assuming $d=\lambda/2$. The equation of signal at the output of the array now is given by:

$$y(t)=\Sigma_{i=0, N-1} \sin(2\pi\Phi t-2\pi id \sin \theta/\lambda+i\Phi) \quad (12)$$

where $i\Phi$ is the phase shift given to the wave arriving at the $i^{th}$ element before adding the waves coming from all the elements (FIG. 4). From equation (12) we see that to look in the direction of $\theta_0$ degree we need to give the phase shift of $i*\pi*\sin \theta 0$ radians at the $i^{th}$ element To look for the source, $\Phi$ can be varied. This is also referred as beam steering or scanning as by changing $\Phi$ one changes the look direction. I developed the software that allowed me to not only scan the beam in the arbitrary direction but also to automatically find the source in any arbitrary direction. The results of these experiments are provided in the next section.

Figure 5:
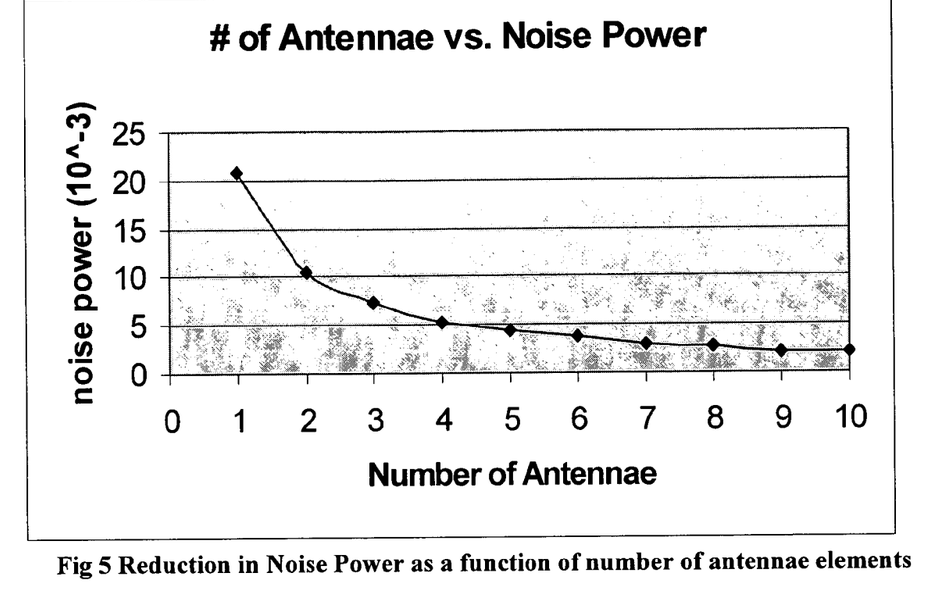
FIG. 5 is a plot illustrating reduction in noise to signal ratio as a function of number of antenna elements.

Table 1 tabulates the output noise to signal power ratio as a function of N—the number of antennae elements. FIG. 5 shows the plot of reduction in noise to signal ratio as a function of number of antenna elements. We see that output noise to signal power ratio decreases with increase in the number of elements N and it is inversely proportional to the number of elements:

$$\text{Output Noise to Signal Power} \propto 1/N \qquad (13)$$

Eventually, this decrease of output noise flattens out at around 0 to form a horizontal asymptote. The maximum reduction is obtained only in the beginning when N is increased from 1 to 2. The rate of reduction slows down as N increases.

TABLE 1

The Signal to Noise Ratio as a Function of Number of Antenna Elements

| Number of Antennae Elements | Output Noise to Signal Power ($10^{-3}$) |
|---|---|
| 1 | 20.9 |
| 2 | 10.6 |
| 3 | 7.3 |
| 4 | 5.3 |
| 5 | 4.4 |
| 6 | 3.8 |
| 7 | 3 |
| 8 | 2.7 |
| 9 | 2.1 |
| 10 | 2 |

Figure 6A:
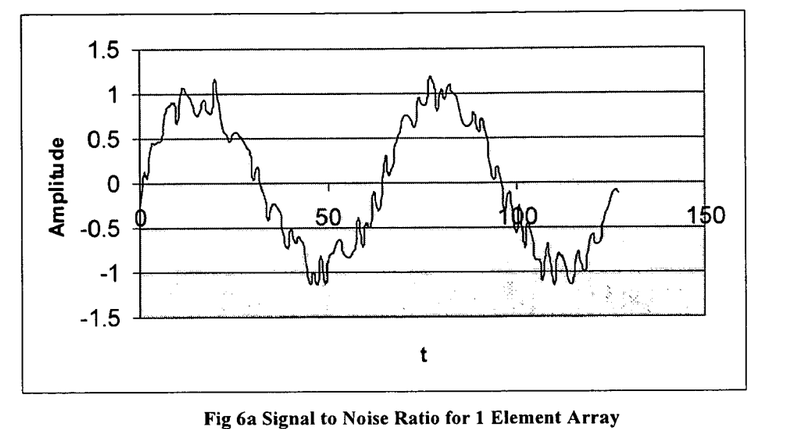
FIGS. 6a-6c are plots illustrating the time domain waveforms y(t) at the output of the array for different antennae elements.
Figure 6B:
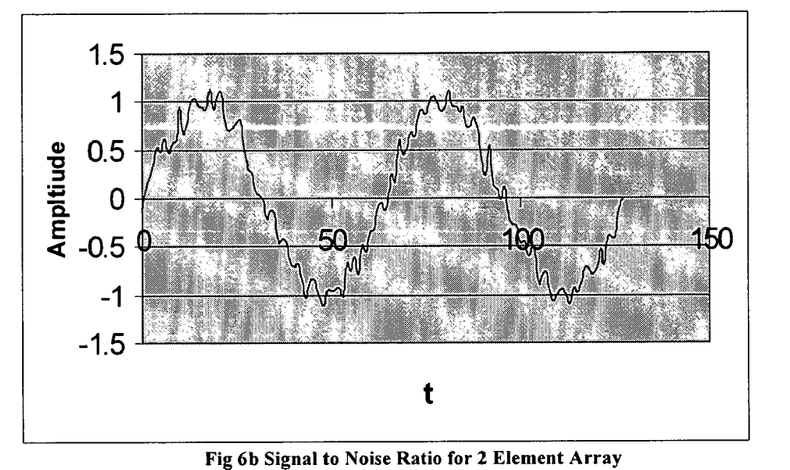
Figure 6C:
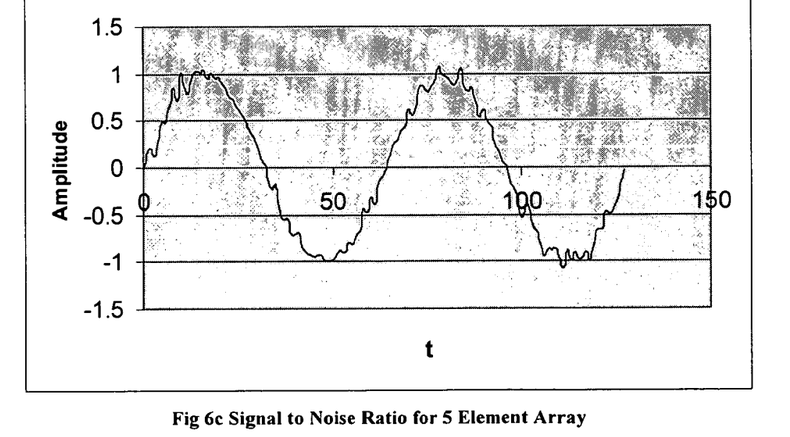

FIG. 6 shows the time domain waveforms y(t) at the output of the array for different antennae elements. FIG. 6a shows the output of one antenna with a certain signal to noise ratio. FIG. 6b shows how the signal to noise ratio improves when we add signals from 2 antennae. FIG. 6c shows how the signal to noise ratio improves even more when we add signals from 5 antennae.

As described above, if array is looking straight up ($\theta=0°$) then as the source moves away from $\theta=0°$ the output of array also changes. Plot of signal strength at the output of the antennae array as a function of $\theta$ is also known as beam pattern of the antennae array.

It also provides the information about how much reduction in the signal strength corresponding to the interferer in an arbitrary direction $\theta$, is achieved. We assume that each antenna element is omni-directional, i.e. it receives signal from horizon to horizon without any loss.

Figure 7A:
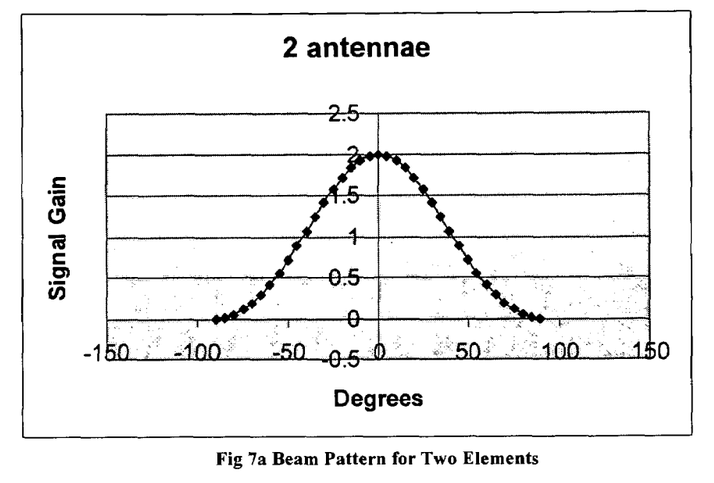
FIG. 7a is a plot illustrating the beam pattern when θ is varied from −90 degrees to 90 degrees (from horizon to horizon) for a two antennae array.

FIG. 7a shows the beam pattern when $\theta$ is varied from −90 degrees to 90 degrees (from horizon to horizon) for 2 antennae array. As expected and described above, the maximum value is for $\theta=0°$ and beam pattern slowly rolls of with $\theta$ as the signals coming from sources in non-zero directions do not add up in phase together.

Figure 7B:
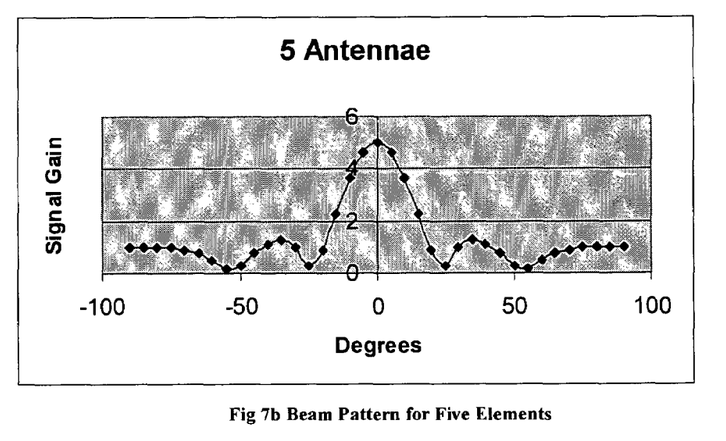
FIG. 7b is a plot illustrating the beam pattern when θ is varied from −90 degrees to 90 degrees (from horizon to horizon) for a five antennae array.

FIG. 7b shows beam pattern when $\theta$ is varied from −90 degrees to 90 degrees (from horizon to horizon) for 5 antennae array. As can be seen, the beam pattern now rolls faster than that for 2 element array. Therefore, 5-element array will provide more interference rejection than 2-element array.

Figure 7C:
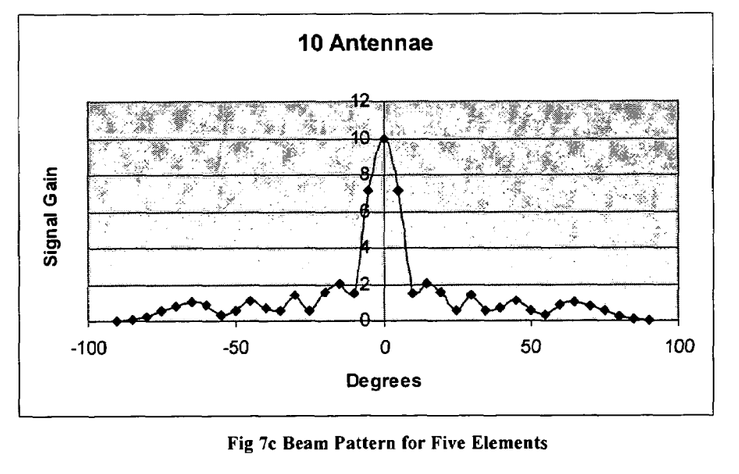
FIG. 7c is a plot illustrating the beam pattern when θ is varied from −90 degrees to 90 degrees (from horizon to horizon) for a ten antennae array.

FIG. 7c shows beam pattern when $\theta$ is varied from −90 degrees to 90 degrees (from horizon to horizon) for 10 antennae array. As can be seen, the beam is now narrower and rolls faster than for 2 or 5 element array. Therefore, 10-element array will provide more interference rejection than 2 or 5-element arrays. As number of elements increase, the width of the beam reduces implying that the array is able to narrow down its field of view and attenuate the interferer more.

Figure 8A:
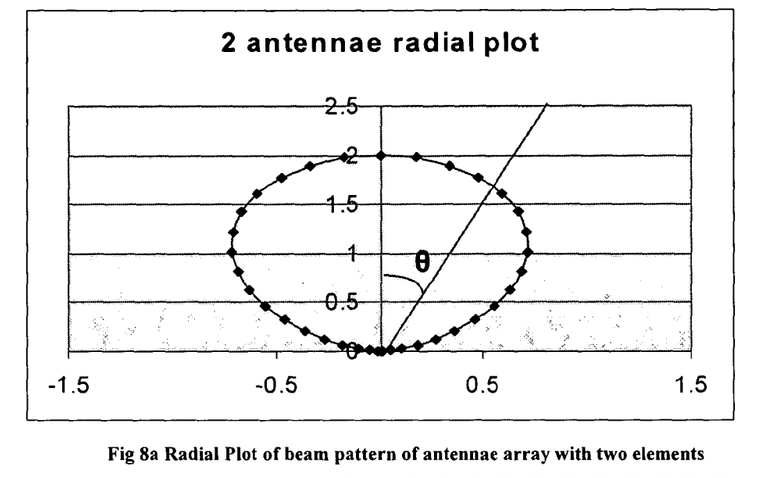
FIGS. 8a-8c are plots illustrating the same results as FIGS. 7a-7c plotted as radial plots (r, θ) where the distance r from the origin represents gain in the signal coming from the direction θ.
Figure 8B:
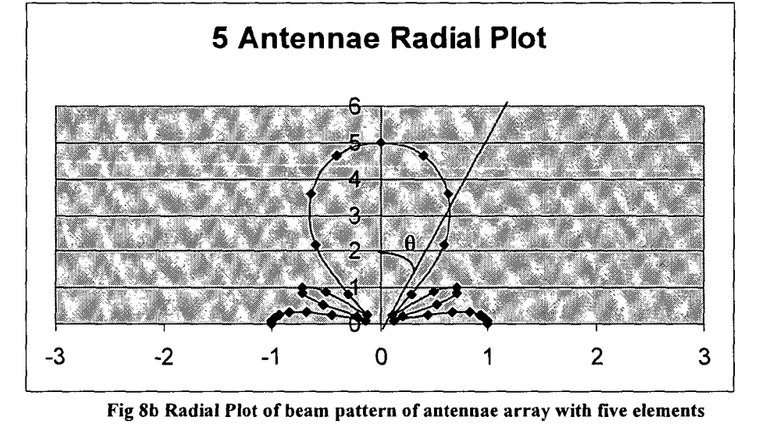
Figure 8C:
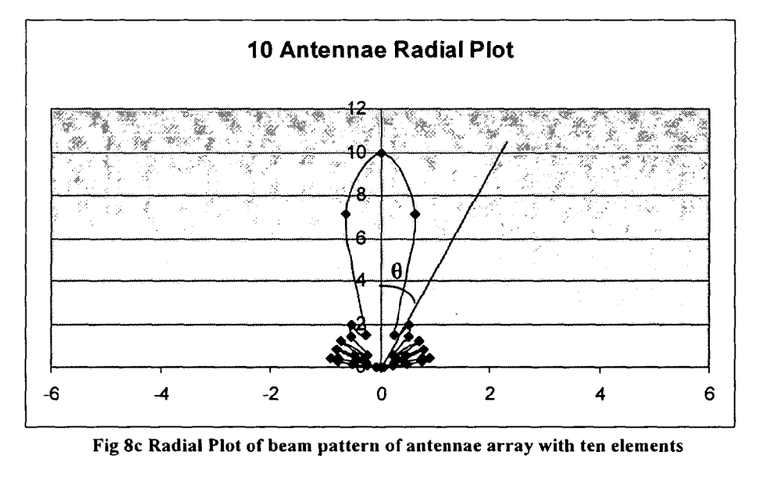

FIGS. 8a, 8b, and 8c show the same results as FIGS. 7a, 7b, and 7c plotted as radial plots (r, $\theta$) where the distance r from the origin represents gain in the signal coming from the direction $\theta$.

Figure 9A:
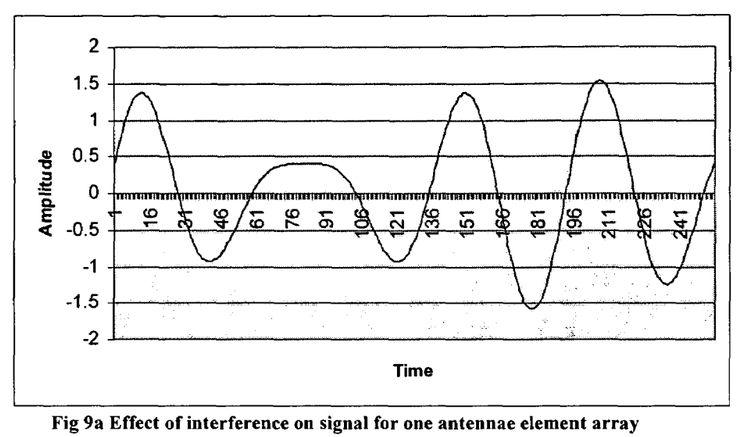
FIG. 9a is a plot illustrating the effect of interference on signal for one antennae element array.

FIG. 9a shows the effect of interference on signal for one antennae element array. As can be seen, the output of an element is distorted due to interference signal. This will cause error in the received signal.

Figure 9B:
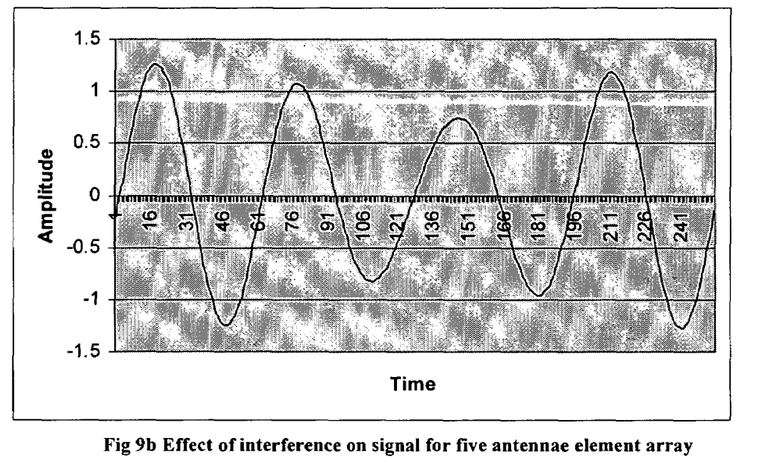
FIG. 9b is a plot illustrating the effect of interference on signal for five antennae element array.

FIG. 9b shows the effect of interference on signal for five antennae element array. As can be seen, the distortion in the output signal is reduced in comparison to FIG. 9a because, as described above, the 5-element array has narrower beam pattern and reduces the interference.

Figure 9C:
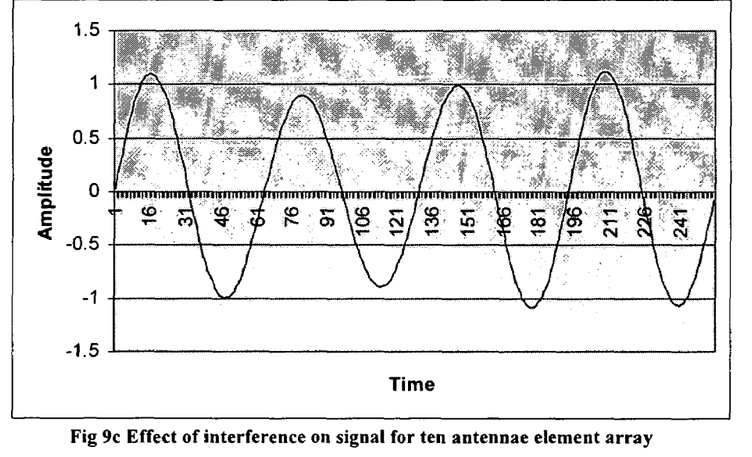
FIG. 9c shows the effect of interference on signal for ten antennae element array.

FIG. 9c shows the effect of interference on signal for ten antennae element array. Now the distortion due to the interference signal is reduced significantly.

Figure 10:
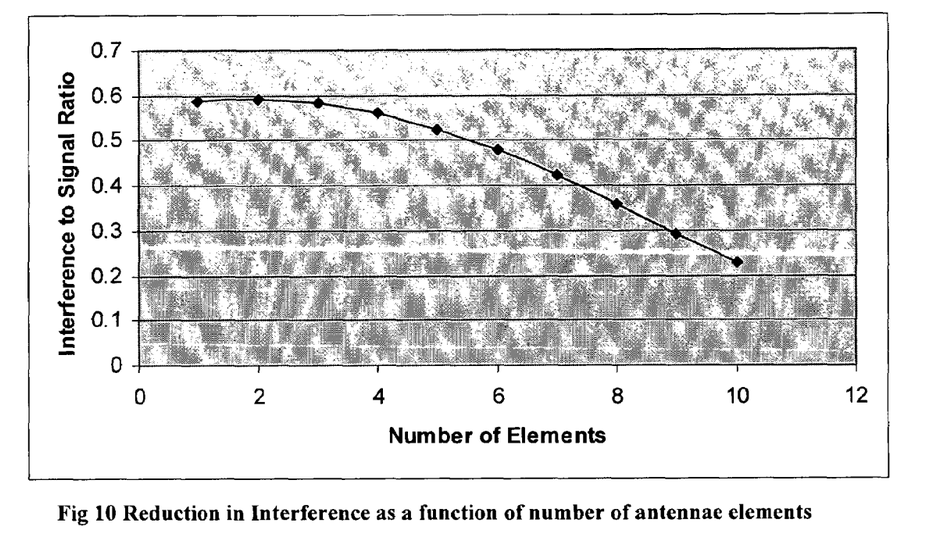
FIG. 10 is a plot illustrating reduction in interference as a function of number of antennae elements.

Table 2 shows how much reduction in interference as a function of number of antennae elements is obtained. FIG. 10 shows the same results graphically.

TABLE 2

Reduction in Interference as a Function of Number of Antennae Elements

| Number of Antennae Elements | Interference amplitude |
|---|---|
| 1 | 0.586060 |
| 2 | 0.592528 |
| 3 | 0.584121 |
| 4 | 0.561429 |
| 5 | 0.525671 |
| 6 | 0.478629 |
| 7 | 0.422548 |
| 8 | 0.360016 |
| 9 | 0.293827 |
| 10 | 0.226834 |

Figure 11A:
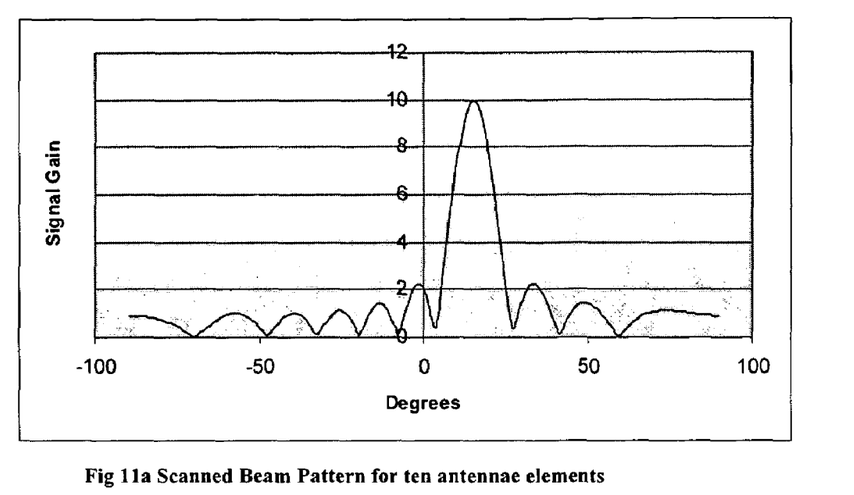
FIGS. 11a and 11b are plots illustrating the beam pattern when the beam is scanned by 20 degrees from the normal direction.
Figure 11B:
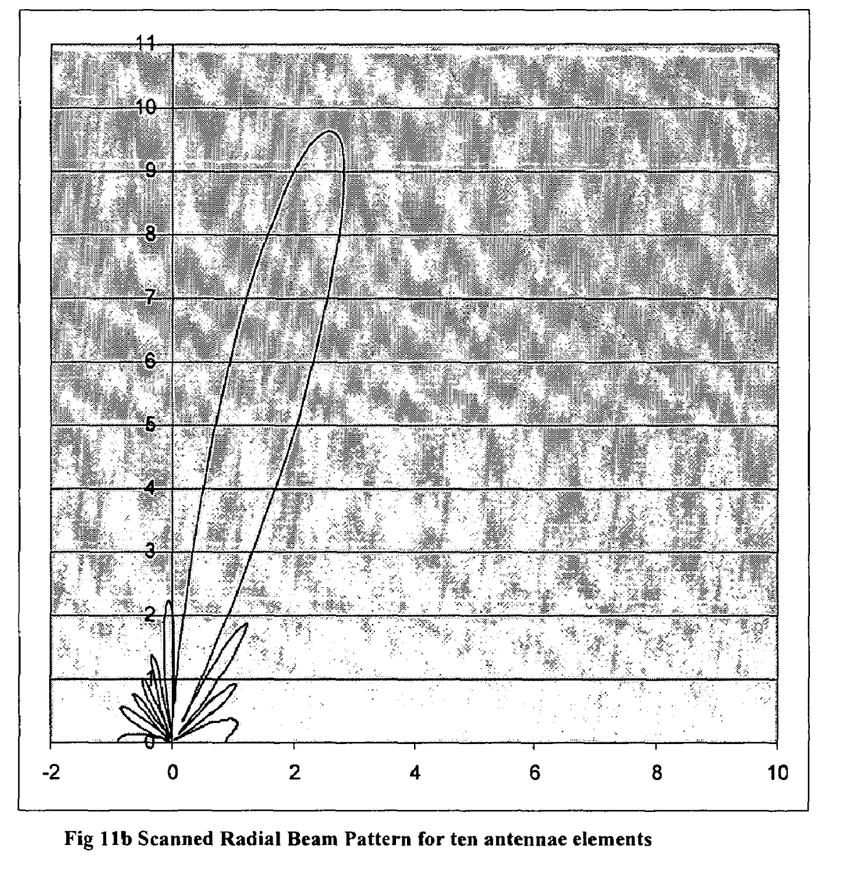

FIGS. 11a and 11b show the beam pattern when beam is scanned by 20 degrees from the normal direction. As explained above, the beam scanning was obtained by giving the phase shift of i*Φ to electromagnetic wave at $i^{th}$ element before adding them up. For example to look in the direction that is 20 degrees ($\pi/9$ radians), I had to give the phase shift $i*\phi=2\pi*\sin(\pi/9)*i \cong 123°*i$ at the $i^{th}$ element at the $i^{th}$ element. FIG. 11a shows the scanned beam pattern for ten antennae elements. FIG. 11b shows the scanned radial pattern for ten antennae elements.

By changing Φ and looking for the value of Φ that gives the highest signal output one can automatically scan and look in the direction of source.

The experiment above were conducted with the antennae spaced half wavelength apart ($d=\lambda/2$). If the spacing between antennae is increased two things happen—(i) the beam becomes narrower so it is capable of discarding the interferers closer to the source, (ii) a second beam starts to appear at an angle away from the source. This is because now the waves coming from that direction also add in phase. Take an example of Φ=0. If $d=2\lambda$ then for $\theta=30$ degrees, $$\sin(2\pi\Phi t - 2\pi id \sin \theta/\lambda) = \sin(2\pi\Phi t - 2\pi i) = \sin(2\pi\Phi t),$$

which is the same as that for the waves coming from $\theta=0$ degrees. Therefore, if interferers can be in any direction from horizon to horizon (−90 degrees to +90 degrees) then the d has to be $\lambda/2$. Otherwise, by increasing d one can provide the benefit of the capability to reject interferers closer to the source.

Figure 12:
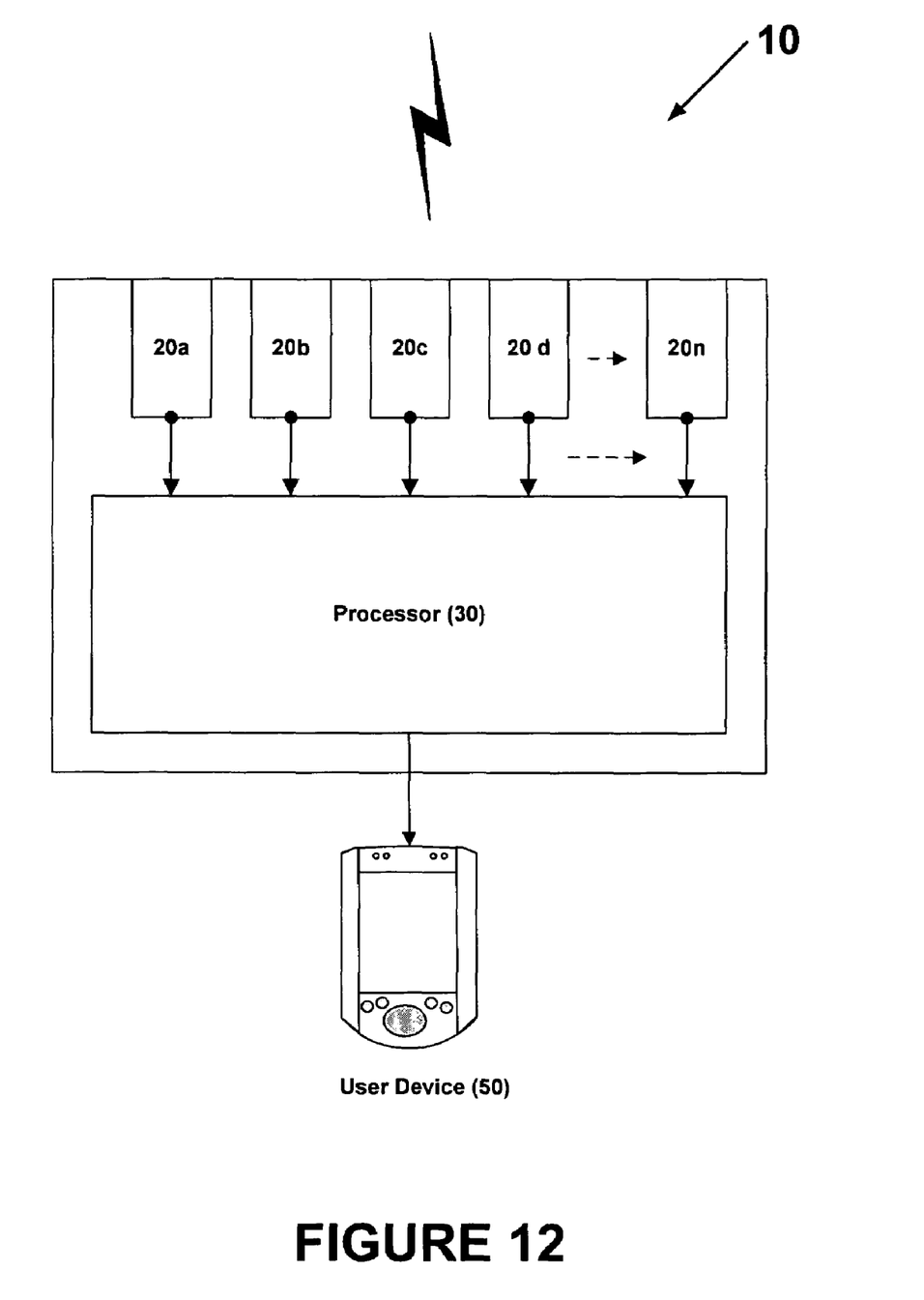
FIG. 12 is a block diagram of a wireless receiver system.

FIG. 12 shows a wireless receiver system 10 that includes a wireless transceiver 15 coupled to a user device 50. Transceiver 15 includes multiple antenna elements 20a-20n, for receiving a wireless signal 18. Transceiver 15 includes a processor 30 that is coupled to receive antenna inputs 22a-22n, respectively, from antenna elements 20a-20n. During operation, processor 30 determines which signal inputs 22a-22n may be combined to provide a combined signal 40 having the greatest combined SNR to user device 50. In more detail, antenna elements 20a-20n receive wireless signal 18 and output the received signal as signal inputs 22a-22n to processor 30. Signal inputs 22a-22n are used by processor 30 to determine individual SNR's of the received signal 18 for each of the antenna elements 20a-20b. Processor 30 executes a program to determine a combination of signal inputs 22a-22n that will produce the greatest SNR in a combined signal 40 to user device 50.

Figure 13:
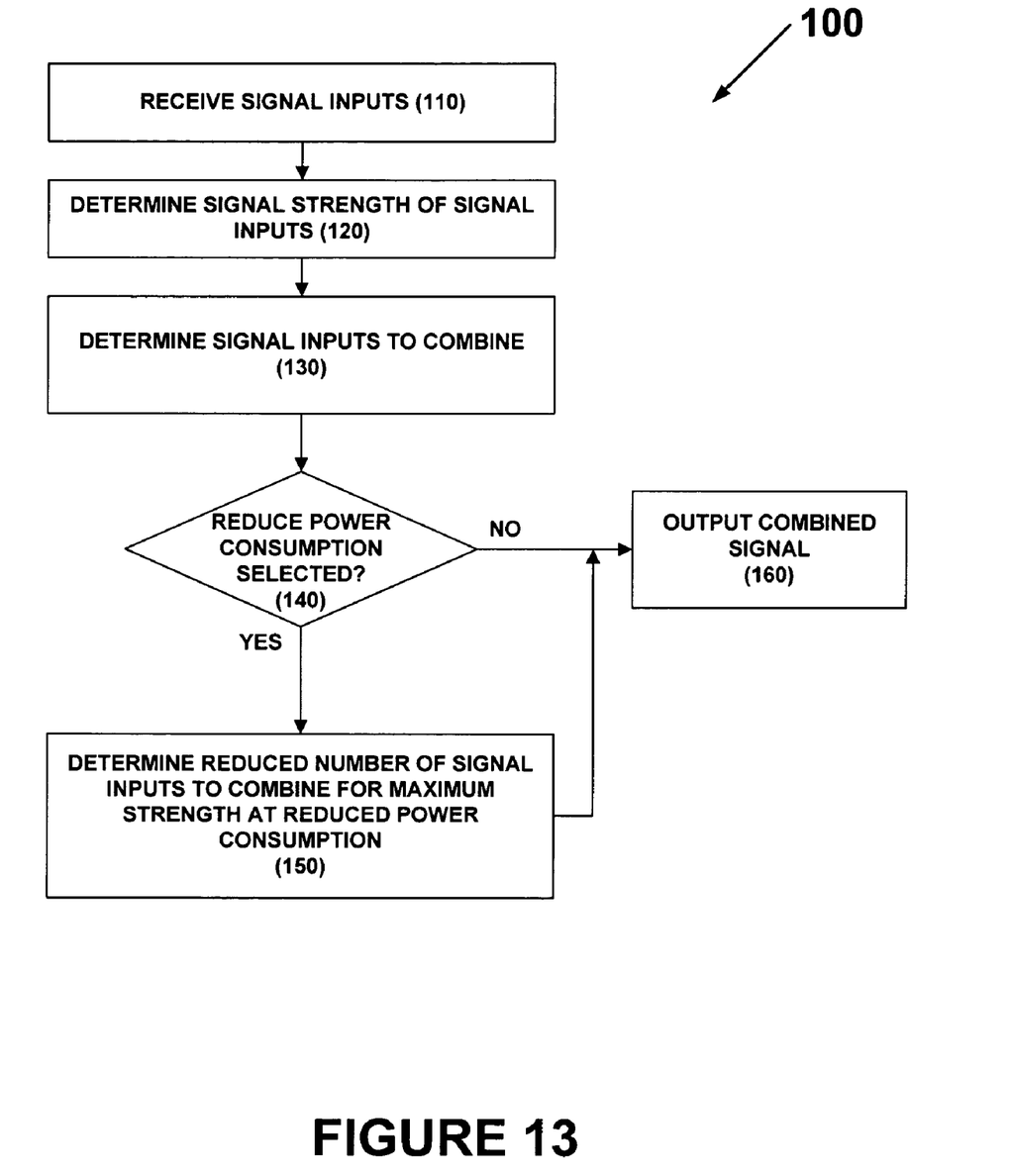
FIG. 13 is a flowchart of a signal combination process.

FIG. 13 shows a process for determining a combination of signal inputs that may be combined in combined signal 40 for a user device. Process 100 includes receiving (110) signal inputs from a plurality of antenna elements, determining (120) a signal strength of the signal inputs, determining (130) which of the signal inputs to combine, and determining (140) whether a reduced power consumption mode has been selected. If it is determined that the reduced power consumption mode has been selected, process 100 includes determining (150) a reduced number of signal inputs to combine. If it is determined that there is no reduced power consumption mode selection, process 100 includes outputting (160) a combined signal based upon a combination of signal inputs for maximum signal strength.

In one implementation of process 100, SNR values for each antenna element are determined and stored as SNR data. The stored SNR data is then sorted to determine a combination of signal inputs that will achieve the highest combined signal strength.

The applicant recognized that the power consumption of system 10 increases as more antenna elements are activated (and/or their respective receiver circuits are activated). Therefore, in one implementation, a user of device 50 may select a "reduce power consumption" mode or an "increase signal strength" mode for transceiver 15. The user selection is input to processor 30 and may be used to determine a combination of signal inputs that increases signal strength, or determine a combination of signal inputs that increase signal strength of the combined signal 40 while reducing overall power consumption (e.g., by combining less antenna elements in the combined signal 40).

In one example of system 10, a SNR is determined for each signal input and stored in a memory accessible to processor 30. Process 100 may then sort the SNR values and select the signal inputs associated with the highest stored SNR values to determine signal inputs to combine in the combined signal to user device 50.

Process 100 may be performed repeatedly to provide a combined signal that is determined in a dynamic fashion. In more detail, as additional signals are received by transceiver 15, process 100 may be repeated to determine updated SNR values for the antenna elements. Process 100 may then determine an updated signal input combination for increasing signal strength in the combined signal 40. In this example, if the determined updated signal input combination is different from the current combination, the signal inputs that are combined are changed to the updated signal input combination.

In one implementation of system 10, five antenna elements are included. Simulations performed by the applicant show that the addition of greater than five antenna elements provides a relatively minor benefit to producing a higher SNR of the combined signal 40. In one example of system 10, combined signal 40 is limited to combinations of signal inputs from only three antenna elements.

The invention is not limited to the specific implementations described herein. For example, antenna elements may refer to physically separate antennas, or may refer to a receiver circuit having an associated antenna element (either internal or external to the receiver circuit, for example). Also, the antenna elements and/or the receiver circuits may be implemented as part of processor 30. Processor 30 may also include a digital signal processing (DSP) component that is implemented in hardware, software, or a combination of hardware and software. The DSP component may be used to combine the signal inputs into a combined signal for user device 50. Transceiver 15 may be implemented as part of a user device 50, or be coupled to user device 50.

A number of embodiments have been described. Nevertheless, it will be understood that various modifications may be made without departing from the spirit and scope of the invention. Accordingly, other embodiments are within the scope of the following claims.

The invention claimed is:

1. A method comprising:
   receiving a plurality of signal inputs from a plurality of antenna elements;
   determining whether a reduced power consumption mode has been selected;
   using all of said signal inputs if said reduced power consumption mode is not detected; and
   responsive to said selection of reduced power consumption, determining a signal strength of the plurality of signal inputs; and determining a combination of multiple ones of the plurality of signal inputs to combine in a combined signal, the combination having a multiple signal inputs, but a number that is less than all of the plurality of signal inputs and using only said combination of multiple signal input, if said reduced power consumption mode is detected.

2. The method of claim 1, further comprises:
   outputting the combined signal to a user device.

3. The method of claim 2, wherein the user device is coupled to communicate with another user device in a wireless network.

4. The method of claim 3, wherein the user device is one of a personal computer, a handheld computer, and a remote control device.

5. The method of claim 1, wherein determining a combination comprises determining a combined signal strength greater than any of the signal strengths of the plurality of inputs.

6. The method of claim 1, wherein the plurality of signal inputs comprises five signal inputs.

7. The method of claim 6, wherein the number of signal inputs combined in the combined signal comprises three signal inputs.

8. An article as in claim 1, wherein said determining comprises determining signal-to-noise ratios of each of the plurality of signal inputs, sorting the signal inputs according to their signal-to-noise ratios, and selecting only some of the signals based on the sorted signal-to-noise ratios.

9. A computer readable medium encoded with a computer program operative to a cause a machine to:
   receive a plurality of signal inputs from a plurality of antenna elements;
   determine whether a reduced power consumption mode has been selected; and
   use all of said signal inputs if said reduced power consumption mode is not detected; and responsive to said selection of reduced power consumption, determine a signal strength of the plurality of signal inputs, and determine a combination of multiple ones of the plurality of signal inputs to combine in a combined signal, the combination having a number of multiple signal inputs that is less than all of the plurality of signal inputs and use only said combination of multiple signal input, if said reduced power consumption mode is detected.

10. The computer readable medium of claim 9, further comprises:
outputting the combined signal to a user device.

11. The computer readable medium of claim 10, wherein the user device is coupled to communicate with another user device in a wireless network.

12. The computer readable medium of claim 11, wherein the user device is one of a personal computer, a handheld computer, and a remote control device.

13. The computer readable medium of claim 9, wherein determining a combination comprises determining a combined signal strength greater than any of the signal strengths of the plurality of inputs.

14. The computer readable medium of claim 9, wherein the plurality of signal inputs comprises five signal inputs.

15. The computer readable medium of claim 14, wherein the number of signal inputs combined in the combined signal comprises three signal inputs.

16. The computer readable medium of claim 9, wherein the plurality of signal inputs comprises at least five signal inputs, and wherein the number of signal inputs combined in the combined signal comprises three signal inputs.

17. An computer readable medium as in claim 9, wherein said determine comprises receiving a plurality of signal inputs, determining signal-to-noise ratio of each of the plurality of signal inputs, sorting the signal inputs according to their signal-to-noise ratio, and selecting only some of the signal inputs based on the sorted signal to noise ratio.

18. A system, comprising: a transceiver to receive a plurality of signal inputs;
a storage medium for storing executable instructions and data; and
a processor for determining a signal strength for each of the plurality of signal inputs, the processor to determine whether a reduced power consumption mode has been selected, use all of said signal inputs if said reduced power consumption mode is not detected and determine a combination of multiple ones of the plurality of signal inputs to combine in a combined signal responsive to said selection of reduced power consumption, the combination having multiple signal inputs that is less than all of the plurality of signal inputs and using only said combination of multiple signal input, if said reduced power consumption mode is detected.

19. The system of claim 18, further comprises:
a plurality of antenna elements, each of the plurality of antenna elements corresponding to a one of the plurality of signal inputs.

20. The system of claim 19, wherein the processor further comprises a processor configured to output the combined signal to a user device.

21. The system of claim 19, wherein the processor further comprises a processor configured to determine a combined signal strength greater than any of the signal strengths of the plurality of inputs.

22. A system as in claim 18, wherein said processor also receives information indicative of the signal-to-noise ratio of the plurality of signal inputs, sorts the signal inputs according to their signal-to-noise ratio, and selects only some of the signal inputs based on the sorted signal-to-noise ratio.

* * * * *